United States Patent [19]

Inoue

[11] Patent Number: 4,566,769

[45] Date of Patent: Jan. 28, 1986

[54] POWER SUPPLY UNIT FOR ELECTRONIC FLASH

[75] Inventor: Akira Inoue, Hachioji, Japan

[73] Assignee: Olympus Optical Co., Ltd., Tokyo, Japan

[21] Appl. No.: 535,027

[22] Filed: Sep. 23, 1983

[30] Foreign Application Priority Data

| | | | |
|---|---|---|---|
| Dec. 29, 1982 | [JP] | Japan | 57-229859 |
| Feb. 15, 1983 | [JP] | Japan | 58-023626 |

[51] Int. Cl.[4] .......................... G03B 1/18; G03B 15/05

[52] U.S. Cl. ................................ 354/145.1; 354/173.1

[58] Field of Search ...................... 354/412, 418, 127.1, 354/127.11, 127.12, 145.1, 173.11, 173.1, 206, 213; 315/241 P, 225; 320/1; 363/19, 49

[56] References Cited

U.S. PATENT DOCUMENTS

| | | | |
|---|---|---|---|
| 3,890,538 | 6/1975 | Iwata et al. | 354/145.1 X |
| 4,096,492 | 6/1978 | Land et al. | 354/418 |
| 4,199,242 | 4/1980 | Hosomizu et al. | 354/145.1 |
| 4,441,774 | 4/1984 | Kazami et al. | 315/241 P |

FOREIGN PATENT DOCUMENTS 48-23744 7/1973 Japan .

*Primary Examiner*—William B. Perkey

*Attorney, Agent, or Firm*—Louis Weinstein

[57] ABSTRACT

A power supply unit for electronic flash includes a converter drive circuit which is activated when a main switch is turned on or in response to the completion of a shutter operation or the completion of a film winding operation, thereby driving a converter for oscillation. The converter charges a main discharge capacitor to a given voltage, and when the given voltage is reached, the converter drive circuit is deactivated, thereby automatically ceasing the oscillation of the converter.

2 Claims, 10 Drawing Figures

POWER SUPPLY UNIT FOR ELECTRONIC FLASH

BACKGROUND OF THE INVENTION

The invention relates to a power supply unit for electronic flash, and more particularly, to such unit which is used to feed a main discharge capacitor of an electronic flash.

A power supply unit for an electronic flash is adapted to charge a main discharge capacitor to a given level which is sufficient to cause the emission of flashlight from a flash discharge tube. Such unit operates to maintain the voltage across the capacitor at a substantially constant level. An example of such power supply unit is illustrated in FIG. 1.

Referring to FIG. 1, a power supply unit shown includes a low voltage d.c. source, shown as a battery 1, having its positive terminal connected to the ground through a power switch 2. The negative terminal of the battery 1 is connected to the ground through a series combination of a resistor 3 and a capacitor 4 and is also connected to the emitter of an NPN transistor 6. The transistor has its base connected through a resistor **6*a* to the collector of a PNP transistor 5 and has its collector connected to one end of a primary coil of an oscillation and step-up transformer 7, the other end of which is connected to the ground. The transistor 5 has its emitter connected to the ground and has its base connected to the junction between the resistor 3 and the capacitor 4 and also to one end of a secondary coil of the transformer 7, the other end of which is connected to the anode of a diode 8. Resistors 3, 6*a*, capacitor 4, transistors 5, 6, transformer 7 and diode 8 form in combination a DC-DC converter 20. The cathode of the diode 8 is connected to the positive terminal of a main discharge capacitor 9, the negative terminal of which is connected to the ground. The capacitor 9 is shunted by a trigger circuit 10 and also by a flash discharge tube 11**.

The trigger circuit 10 includes a series combination of a resistor 12 and synchro contact 13, which combination is connected in parallel with the capacitor 9. The junction between the resistor 12 and the contact 13 is connected through a trigger capacitor 14 to one end of a primary coil of a trigger transformer 15, the other end of which is connected to the ground as is one end of a secondary coil thereof. The other end of the secondary coil is connected to a trigger electrode 16 of the flash discharge tube 11. A circuit is provided which operates to cease the oscillating operation of a converter 20 in response to the detection that the voltage across the capacitor 9 has reached a given level. This circuit comprises a series combination of a resistor 17 and a gaseous discharge tube 18, the combination having one end thereof connected to the positive terminal of the capacitor 9. The circuit also includes an NPN transistor 19 having its base connected to the other end of the series combination. The transistor 19 has its emitter connected to the base of the transistor 5 and its collector connected to the ground.

In operation, when the power switch 2 is closed, the transistors 5 and 6 in the converter 20 are repeatedly turned on and off, thus producing an oscillation. An intermittent current flow occurs through the primary coil of the transformer 7 through a path including the transistor 6, and as a result, a high tension alternating current is induced across the secondary coil of the transformer 7. The secondary voltage is applied through the diode 8 to the main capacitor 9, which therefore is charged and its terminal voltage increases gradually. When the voltage across the capacitor 9 reaches a given level, which is indicated at $V_1$ in FIG. 2, the gaseous discharge tube 18 discharges, supplying a base current to the transistor 19, thus rendering it conductive. As a consequence, the base-emitter path of the transistor 5 is short-circuited, and this transistor is turned off, thus ceasing the oscillating operation of the converter 20. During the interruption of the oscillation, the charge stored across the capacitor 9 is dissipated in a gradual manner as a result of the base current supplied to the transistor 19 and the self-discharge of the capacitor 9 as the time passes. When the voltage across the capacitor 9 reduces to a level indicated at $V_2$ in FIG. 2, the gaseous discharge tube 18 ceases to discharge, whereupon the emitter-collector path of the transistor 19 presents a high resistance, allowing the transistor 5 to be turned on to allow the converter 20 to resume oscillation. The described operation is repeated to maintain the voltage across the capacitor 9 substantially constant between the levels $V_1$ and $V_2$.

However, in the described power supply unit, it will be noted that the charge stored across the capacitor 9 is dissipated as a base current to the transistor 19, causing an accelerated reduction in the terminal voltage of the capacitor 9. In addition, if the power switch 2 is inadvertently left closed, the charging and discharge process of the capacitor 9 as illustrated in FIG. 2 is repeated, causing the battery 1 to be rapidly exhausted.

SUMMARY OF THE INVENTION

It is an object of the invention to provide a power supply unit for electronic flash in which an oscillating operation of a converter is immediately interrupted, regardless of the condition of a power switch, when a main discharge capacitor of an electronic flash is completely charged.

It is another object of the invention to provide a power supply unit for electronic flash in which the oscillating operation of a converter is initiated upon completion of a shutter release operation or of a film winding operation.

It is a further object of the invention to provide a power supply unit for electronic flash which prevents a discharge of a main discharge capacitor whenever the completion of a charging of the latter is detected.

It is still another object of the invention to provide a power supply unit for electronic flash including a converter drive circuit which is interlocked with a film winding motor circuit.

It is a still further object of the invention to provide a power supply unit for electronic flash in which the oscillating operation of a converter is resumed when a power switch, which has inadvertently been left closed, is operated again.

In accordance with the invention, when a charging operation of a main discharge capacitor is completed, a converter is maintained quiescent without resuming the oscillating operation until a shutter operation or a film winding operation is completed. Accordingly, if a power switch is inadvertently left closed, a wasteful power dissipation is avoided, thus preventing a wasteful exhaustion of a battery energy. The completion of a charging operation is detected immediately to disable a converter drive circuit. This eliminates any power dissipation within the drive circuit after the completion of a charging operation, and the voltage across the main discharge capacitor can be maintained constant over a prolonged period of time without any dissipation thereof. Furthermore, the choice of a suitable turns ratio of a transformer contained in the converter enables a rapid charging operation, thus reducing the time length required for the charging operation.

DESCRIPTION OF PREFERRED EMBODIMENTS

Figure 1:
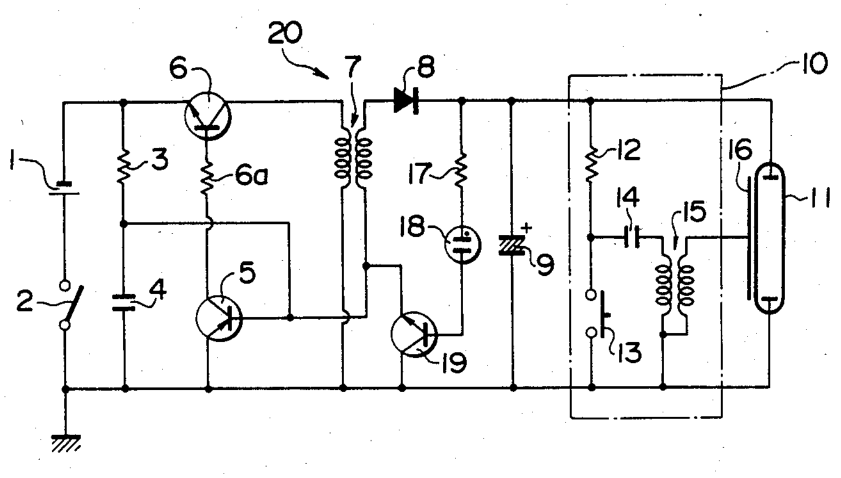
FIG. 1 (PRIOR ART)
FIG. 1 is a circuit diagram of an exemplary power supply unit for electronic flash of the prior art.
Figure 2:
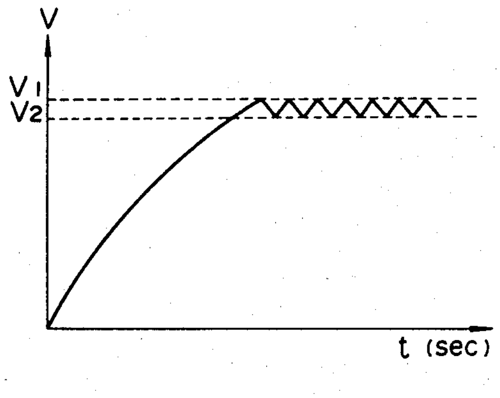
FIG. 2 (PRIOR ART)
FIg. 2 graphically shows a charging characteristic of the power supply unit shown in FIG. 1.
Figure 3:
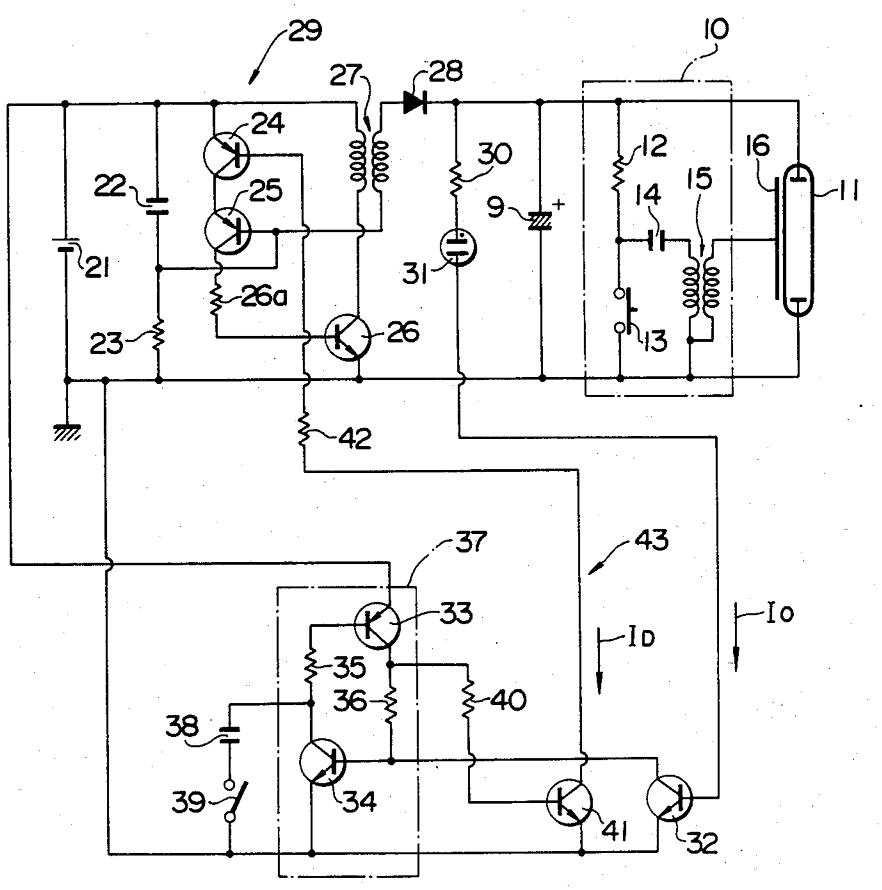
FIG. 3 is a circuit diagram of a power supply unit for electronic flash according to one embodiment of the invention.

Referring to FIG. 3, there is shown a circuit diagram of a power supply unit for electronic flash according to one embodiment of the invention. A battery 21 is shown as a low voltage d.c. source, and has its positive terminal connected to one end of a capacitor 22, to the emitter of a PNP transistor 24 which effects the control of a converter, and to one end of a primary coil of an oscillating and step-up transformer 27. The other end of the capacitor 22 is connected through a resistor 23 to the negative terminal of the battery 21, which represents a ground potential. The transistor 24 has its collecter connected to the emitter of an oscillator transistor 25 of PNP type, the collector of which is in turn connected through a resistor 26*a* to the base of an oscillator transistor 26 of NPN type. The transistor 25 has its base connected to the junction between the capacitor 22 and the resistor 23 and also connected to one end of a secondary coil of the transformer 27. The transistor 26 has its collector connected to the other end of the primary coil of the transformer 27 and its emitter connected to the ground. The other end of the secondary coil of the transformer is connected to the anode of a diode 28. The capacitor 22, resistors 23, 26*a*, transistors 24 to 26, transformer 27 and diode 28 form together a DC-DC converter 29. A main discharge capacitor 9 is connected between the cathode of the diode 28 and the ground, and is shunted by a trigger circuit 10 and a flash discharge tube 11, both of which are similar to those illustrated in FIG. 1. The positive terminal of the capacitor 9 is connected to one end of a resistor 30, the other end of which is connected through a gaseous discharge tube 31 to the base of an NPN transistor 32, which operates as a switching element to turn a converter control circuit 43 on.

The converter control circuit 43 includes a subcircuit 37 comprising PNP transistor 33, NPN transistor 34 and resistors 35, 36 and serving as a latch circuit which drives a converter. Specifically, the transistor 33 has its emitter connected to the positive terminal of the battery 21 and its collector connected through the resistor 36 to the base of the transistor 34. The transistor 34 has its emitter connected to the ground and its collector connected through the resistor 35 to the base of the transistor 33. The collector of the transistor 34 is also connected through a capacitor 38 to one terminal of a switch 39, the other terminal of which is connected to ground. The switch 39 is normally open, and is adapted to activate the latch circuit in response to the completion of winding one frame of a film if a motor is used for a film winding operation or in response to the completion of a shutter operation if a manual film winding is utilized. The collector of the transistor 33 is also connected through a resistor 40 to the base of an NPN transistor 41, which is turned on by the latch circuit 37. The transistor 41 has its emitter connected to the ground and its collector connected through a resistor 42 to the base of the transistor 24. The base of the transistor 34 is also connected to the collector of the transistor 32, the emitter of which is connected to the ground.

Figure 4:
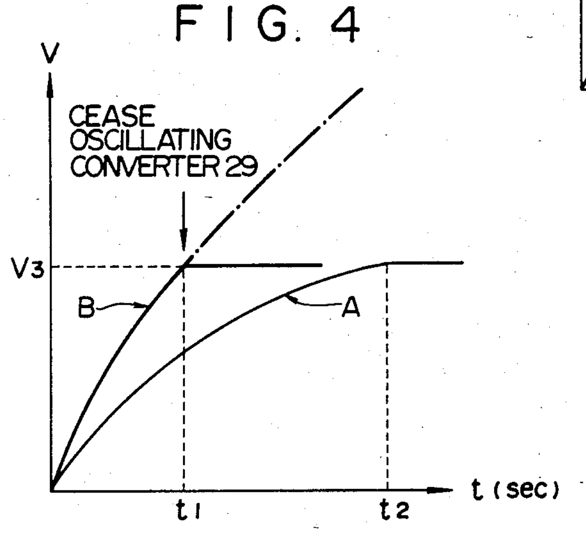
FIG. 4 graphically shows a charging characteristic of the power supply unit shown in FIG. 3.

In operation, when a motor housed within a photographic camera operates to wind up one frame of a film or when a shutter operation is completed if a manual winding is utilized, the normally open switch 39 becomes closed. This produces a current flow from the emitter of the transistor 33 through a path including the base of this transistor, resistor 35, capacitor 38 and switch 39, thus turning the transistor 33 on. This allows a current flow through another path including the collector of the transistor 33, resistor 36 and the base-emitter path of the transistor 34, thus turning this transistor on. In this manner, both transistors 33 and 34 are latched in their on condition. When the latch circuit 37 is activated in this manner, a current flow from the collector of the transistor 33 turns the transistor 41 on, by producing a current flow which passes through a path including the resistor 40 and the base-emitter path of the transistor 41. Then a converter drive current $I_D$ flows through a path including the emitter of the control transistor 24, the base thereof, resistor 42 and the collector-emitter path of the transistor 41, thus turning the transistor 24 on. When the transistor 24 is turned on, the transistors 25 and 26 are repeatedly turned on and off and thus oscillate, allowing an intermittent current flow through the primary coil of the transformer 27 from the battery 21, inducing a high alternating voltage across the secondary coil of the transformer 27. The secondary voltage is applied through the diode 28 to the main discharge capacitor 9. The capacitor 9 is charged, the terminal voltage thereof progressively increases as indicated by a charging characteristic curve B shown in FIG. 4. When the terminal voltage reaches a given level $V_3$, the discharge of the gaseous discharge tube 31 occurs to produce a current flow through a path including the resistor 30, the discharge tube 31, and the base-emitter path of the transistor 32, thus turning this transistor on. The current $I_O$ which flows at this time represents a signal indicating the completion of a charging operation. Since the base-emitter path of the transistor 34 becomes short-circuited, it is turned off. As the transistor 34 is turned off, the base current to the transistor 33 is interrupted and is thus turned off, deactivating the latch circuit 37. Consequently, the base current to the transistor 41 is also interrupted, turning this transistor off. As a consequence, the converter drive current $I_D$ ceases to flow and the control transistor 24 is turned off, thus interrupting the oscillating operation of the converter 29. After the converter 29 ceases to oscillate, it is prevented from resuming oscillation as in a conventional arrangement shown in FIG. 1 if the voltage across the capacitor 9 tends to decrease. In this manner, a wasteful dissipation of the battery 21 can be avoided. After the gaseous discharge tube 31 discharges to turn the transistor 32 on to thereby cease the oscillation of the converter 29, a further discharge thereof is immediately interrupted by turning the transistor 32 off again. Thus, the terminal voltage across the capacitor 9 will diminish only through the self-discharge thereof after the converter ceases to oscillate, unless a circuit such as one used to indicate the charged condition is connected in shunt with the main discharge capacitor 9. By experiments, it is found that when charged to 200 volts, the main discharge capacitor 9 exhibits a voltage level of 180 volts after one hour and a voltage level of 170 volts after three hours, both of which are sufficient to enable the emission of flashlight. When a greater turns ratio between the primary and the secondary coil of the transformer 27 is chosen, the voltage across the main capacitor increases according to the charging characteristic curve B and reaches a given level at time t1, which is earlier than time t2 when the given level will be reached according to the charging characteristic curve A which will be achieved by the use of a conventional power supply unit. Thus, the length of the time period required for the charging operation can be reduced.

After the completion of the charging operation, when the synchro contact 13 is closed at a synchronized timing in response to a shutter release, the charge stored across the trigger capacitor 14 discharges through the primary coil of the trigger transfomer 15, developing a trigger pulse across the secondary coil thereof for application to the trigger electrode 16 of the flash discharge tube 11, thus initiating the emission of flashlight from the tube 11 through a discharge of the main capacitor 9 therethrough. The converter 29 does not resume oscillation if the capacitor 9 discharges through the tube 11 during the emission of flashlight therefrom, but initiates its oscillation only when the latch circuit 37 is activated by a closure of the switch 39, which occurs in response to a film winding operation under the drive from an associated motor or in response to the completion of a shutter operation.

Figure 5:
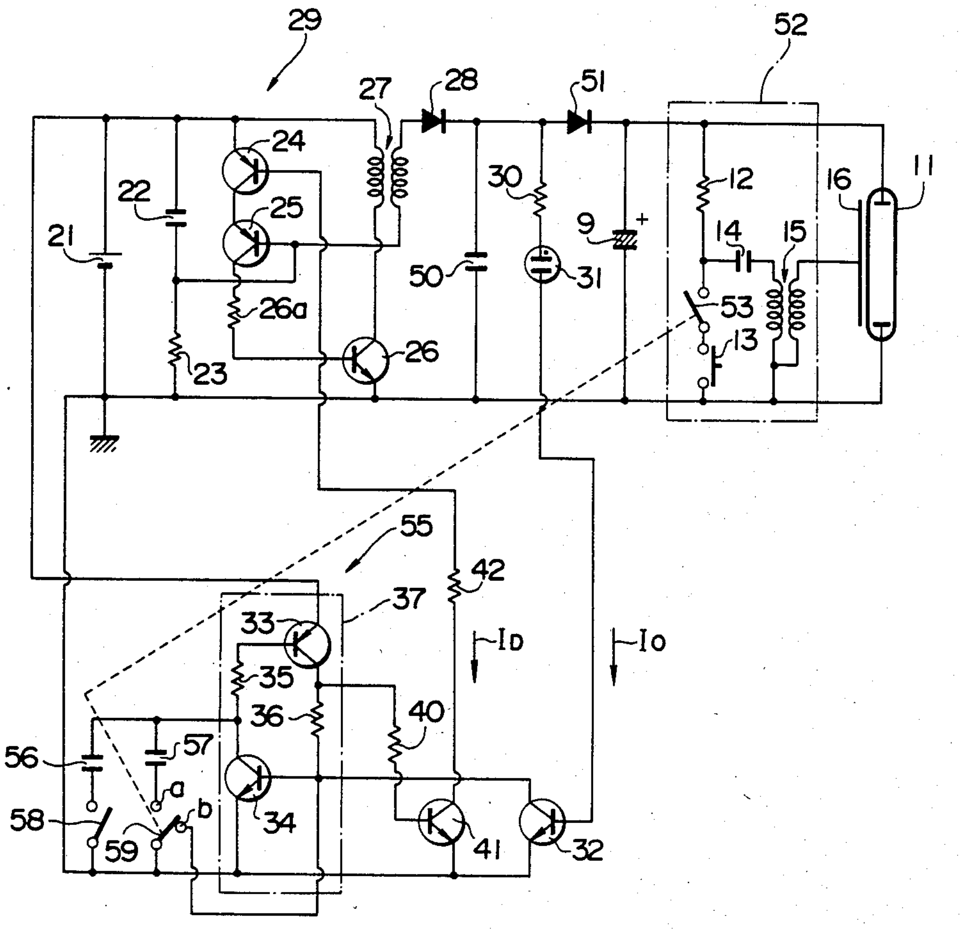
FIG. 5 is a circuit diagram of a power supply unit for electronic flash according to another embodiment of the invention.

FIG. 5 is a circuit diagram of a power supply unit for electronic flash according to another embodiment of the invention. The power supply unit shown is provided with a main switch which starts a converter, and is adapted to be used with a camera which utilizes a manual film winding. It will be noted that the converter 29 is constructed in the similar manner as that shown in FIG. 3, except that an auxiliary capacitor 50 having a substantially reduced capacitance as compared with that of the main capacitor 9, for example, on the order of 0.01 $\mu$F, is connected between the cathode of the diode 28 and the ground. The purpose of the auxiliary capacitor 50 is to cause a discharge of the gaseous discharge tube 31. The cathode of the diode 28 is also connected to the anode of a diode 51, the cathode of which is connected to the positive terminal of the main capacitor 9, a trigger circuit 52 and the positive terminal of the flash discharge tube 11. The negative terminal of the main capacitor 9, the other end of the trigger circuit 52 and the negative terminal of the discharge tube 11 are connected to the ground in the same manner as shown in FIG. 3. The trigger circuit 52 is arranged in the same manner as the trigger circuit 10 shown in FIG. 3, except that a switch 53 is connected in series with the synchro contact 13. The switch 53 is mechanically interlocked with a main switch 59, which is included in a converter control circuit 55, and is manually turned on and off.

The converter control circuit 55 includes a converter driving latch circuit 37 which is connected between the positive terminal of the battery 21 and the ground. The arrangement of the latch circuit 37 itself remains the same as shown in FIG. 3. Additionally, the control circuit 55 includes a pair of capacitors 56, 57 having their one end connected to the collector of the transistor 34 of the latch circuit 37. The other end of the capacitor 56 is connected to the ground through a switch 58 which is closed upon completion of a shutter operation. The other end of the capacitor 57 is connected to an on contact a of the main switch 59. The main switch 59 has a movable contact connected to the ground, and also includes an off contact b which is connected to the base of the transistor 34.

In operation, when it is desired to use an electronic flash, the movable contact of the main switch 59 is thrown to the on contact a. The switch 53 of the trigger circuit 52 is also closed. As the main switch 59 is turned on, a base current is supplied to the transistor 33 of the latch circuit 37 through the resistor 35, capacitor 57 and main switch 59, thus turning this transistor on. As the transistor 33 is turned on, a base current is supplied to the transistor 34 through the resistor 36 and the base-emitter path of this transistor, also turning this transistor on, thus maintaining the transistor 33 latched on. The transistor 33, which is turned on, supplies a base current to the transistor 41 through the resistor 40, thus turning it on. Accordingly, a converter drive current $I_D$ passes through the resistor 42, causing a base current through the control transistor 24, which is therefore turned on. This initiates the oscillating operation of the converter 29, developing a high alternating voltage across the secondary coil of the transformer 27, which is rectified to apply a high d.c. voltage between the cathode of the diode 28 and the ground. This charges the capacitor 50, and is also fed through the diode 51 to charge the main discharge capacitor 9. The length of the time required to charge the capacitor 9 can be reduced by choosing a greater turns ratio for the transformer 27, as mentioned previously.

When the capacitor 9 is completely charged and the terminal voltage thereacross reaches a given level, it is detected by the gaseous discharge tube 31 by discharging the capacitor 50. It is to be noted that at this time, the presence of the diode 51 prevents a discharge of the capacitor 9 through the discharge tube 31, but only the charge stored across the auxiliary capacitor 50, having a reduced capacitance as compared with the capacitor 9 and charged to the same voltage as the latter, discharges through a path including the resistor 30, discharge tube 31, and the base-emitter path of the transistor 32 to supply a current $I_O$, indicative of the completion of a charging operation, thus turning the transistor 32 on. Thereupon, the transistor 34 in the latch circuit 37 has its base-emitter path short-circuited and becomes off, and accordingly, the transistor 33 is also turned off, whereby the latch circuit 37 is deactivated. The deactivation of the latch circuit 37 turns the transistor 41 off, ceasing the flow of the converter drive current $I_D$ to turn the control transistor 24 off, thus ceasing the oscillation of the converter 29.

It will be appreciated from the above description that when the main switch 59 is turned on if an electronic flash is to be utilized, the converter 29 oscillates to charge the capacitor 9 to a given level. However, when the charging operation is completed, the converter 29 ceases to be driven and hence ceases to oscillate if the main switch 59 is left on. Specifically, as the auxiliary capacitor 50 completes its discharge through the gaseous discharge tube 31, the transistor 32 is turned off. This eliminates the short-circuited condition of the base-emitter path of the transistor 34, but since the transistor 33 remains off as a result of a failure of the base current passing through the capacitor 57, main switch 59 and the transistor 33, the latch circuit 37 remains deactivated after the discharge through the gaseous discharge tube 31 is interrupted. Accordingly, the converter 29 is maintained out of oscillation, preventing any wasteful dissipation of the energy of the battery 21 if the main switch 59 is inadvertently left closed. Since the discharge through the gaseous discharge tube 31 is supplied from the capacitor 50 having a reduced capacitance, there is no substantial reduction in the terminal voltage of the main capacitor 9.

When the main switch 59 is turned on, the switch 53 in the trigger circuit 52 is also closed, so that a subsequent shutter release to close the synchro contact 13 permits a trigger pulse to be applied to the trigger electrode 16 of the flash discharge tube 11, allowing it to emit flashlight by a discharge of the main capacitor 9 for purpose of flash photography.

Upon completion of a shutter operation of the flash photography, the switch 58 is closed in response thereto. A base current is then supplied to the transistor 33 through a path including the resistor 35, capacitor 56 and the switch 58, in the same manner as when the main switch 59 is turned on, thus turning the transistor 33 on. This allows a base current to be supplied to the transistor 34 to turn it on, again activating the latch circuit 37. The activation of the latch circuit turns the transistor 41 on, supplying a base current to the control transistor 24 through the resistor 42, supplying a converter drive current $I_D$. Accordingly, the converter 29 resumes oscillation to initiate a charging of the main capacitor 9.

When the capacitor 9 is charged and the terminal voltage thereacross reaches a given level, the capacitor 50 discharges through the discharge tube 51 to produce a current $I_O$, indicative of the completion of a charging operation, which turns the transistor 32 on. The termination of the discharge deactivates the latch circuit 37, which in turn turns the transistor 41 off, whereby the converter drive current $I_D$ ceases to flow and the transistor 24 is turned off, ceasing the oscillation of the converter 29.

Thus, after the completion of a charging of the main capacitor 9, the converter control circuit 55 including the latch circuit 37 as well as the converter 29 are disabled even though the main switch 59 remains on, thus avoiding a wasteful power dissipation. It is believed that this drastically reduces the exhaustion rate of the battery 21. Subsequently, the trigger circuit 52 is activated by the closure of the synchro contact 13 which occurs in response to a shutter release, thus causing a discharge of the capacitor 9 through the flash discharge tube 11, allowing the latter to emit flashlight. However, thereafter, the converter 29 cannot be enabled to oscillate until the switch 58 is closed to activate the latch circuit 37 when a shutter operation is completed.

Figure 6:
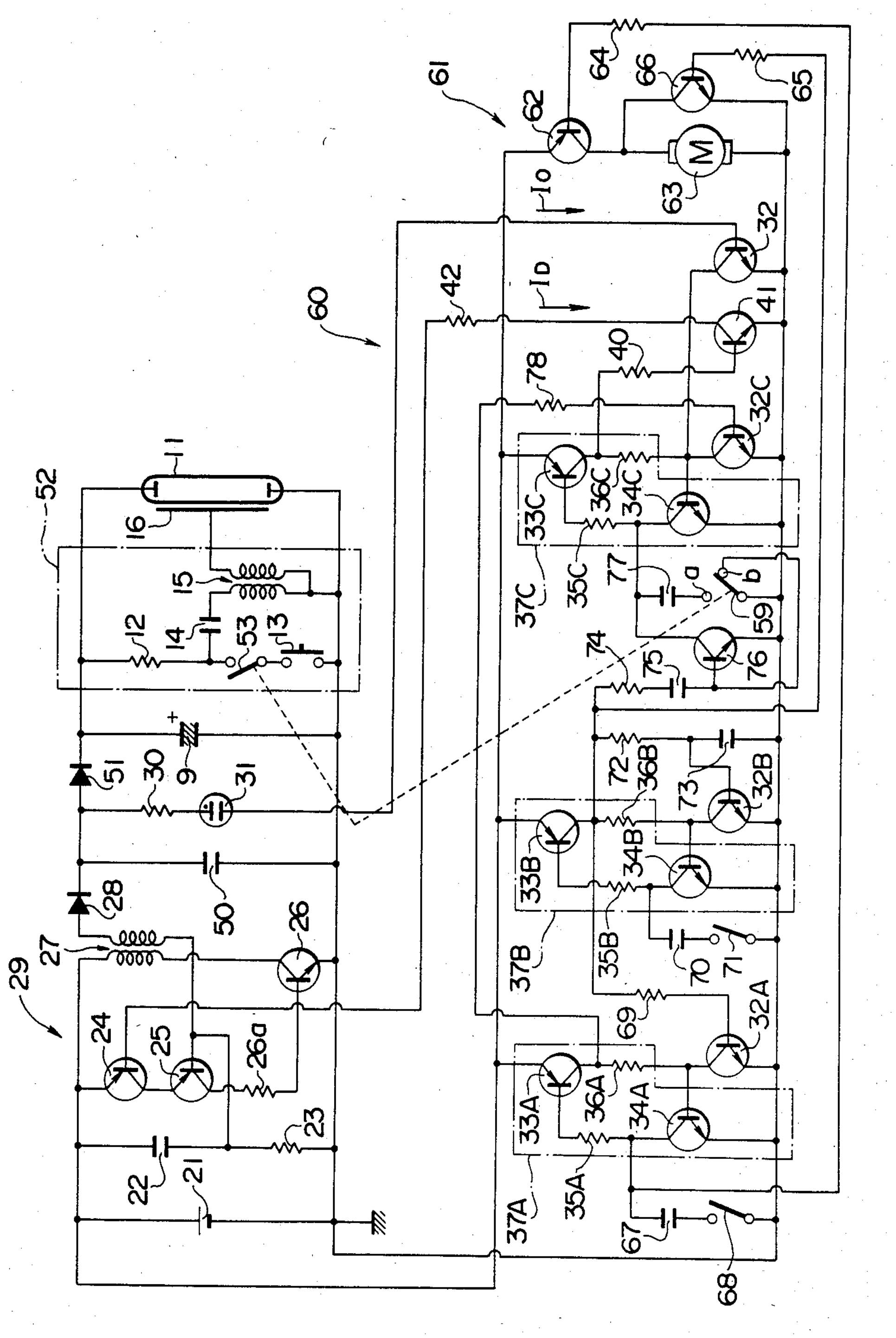
FIG. 6 is a circuit diagram of a power supply unit for electronic flash according to a further embodiment of the invention.

FIG. 6 is a circuit diagram of a power supply unit for electronic flash according to a further embodiment of the invention. This power supply unit is adapted to be used with a camera utilizing a motor drive to effect a film winding operation. This power supply unit is primarily distinguished from the previous embodiment in the arrangement of a converter control circuit 60, which additionally includes a motor drive winding circuit.

Specifically, the converter control circuit 60 includes a motor circuit 61 comprising a PNP transistor 62 having its emitter connected to the positive terminal of the battery 21 and its collector connected to the positive terminal of a motor 63. The negative terminal of the motor 63 is connected to the ground. Three latch circuits, each constructed in a manner similar to the latch circuit 37 shown in FIG. 5, are connected between the positive terminal of the battery 21 and the ground. These include a winding latch circuit 37A formed by transistors 33A, 34A and resistors 35A, 36A; a brake latch circuit 37B formed by transistors 33B, 34B and resistors 35B, 36B; and a converter driving latch circuit 37C formed by transistors 33C, 34C and resistors 35C, 36C.

The transistor 34A in the winding latch circuit 37A has its collector connected to one end of a capacitor 67 and also connected through a resistor 64 to the base of the motor driving transistor 62. The other end of the capacitor 67 is connected to the ground through a winding initiate switch 68 which is closed upon completion of a shutter operation. The transistor 34A has its base connected to the collector of a transistor 32A, the emitter of which is connected to the ground and the base of which is connected through a resistor 69 to the collector of the transistor 33B.

The transistor 34B in the brake latch circuit 37B has its collector connected to one end of a capacitor 70, the other end of which is connected to the ground through a winding complete switch 71 which is closed upon completion of winding up one frame of a film under the drive from the motor 63. The transistor 34B has its base connected to the collector of a transistor 32B, the emitter of which is connected to the ground and the base of which is connected to the junction between a resistor 72 and a capacitor 73 which are connected in series between the collector of the transistor 33B and the ground. The collector of the transistor 33B is connected through a resistor 65 to the base of an NPN transistor 66 which effects braking the motor, and is also connected to the base of an NPN transistor 76 through a series combination of a resistor 74 and a capacitor 75. The braking transistor 66 has its collector and emitter connected with the positive and the negative terminal, respectively, of the motor 63.

The collector of the transistor 76 is connected to the collector of the transistor 34C in the converter driving latch circuit 37C, and has its emitter connected to the ground. The collector of the transistor 34C is connected with one end of a capacitor 77, the other end of which is connected to an on contact a of the main switch 59 which is closed whenever the switch 53 is closed. The main switch 59 includes a movable contact connected to the ground and also includes an off contact b which is connected to the base of the transistor 76. The base of the transistor 34C is connected to the collector of a transistor 32C, the emitter of which is connected to the ground and the base of which is connected through a resistor 78 to the collector of the transistor 33A in the winding latch circuit 37A. The collector of the transistor 33C in the converter driving latch circuit 37C is connected through a resistor 40 to the base of the transistor 41, generally in the same manner as shown in FIGS. 3 and 5. The transistor 41 has its emitter connected to the ground and its collector connected through a resistor 42 to the base of the transistor 24 in the converter 29. The transistor 32 has its collector connected to the base of the transistor 34C, its emitter connected to the ground and its base connected to one end of a series combination of a resistor 30 and a gaseous discharge tube 31, which has its other end connected to the cathode of a diode 28.

In operation, when it is desired to utilize an electronic flash, the movable contact of the main switch 59 is thrown to the on contact a. In response thereto, the converter driving latch circuit 37C is activated through a sequential turn-on of the transistors 33C and 34C, thus turning the transistor 41 on. This permits a base current to be supplied to the control transistor 24 through the resistor 42 as a converter drive current $I_D$, thereby turning the transistor 24 on. Thereupon, the converter 29 initiates its oscillation, and its output or a high tension d.c. voltage is applied across the cathode of the diode 28 and the ground, thus charging the auxiliary capacitor 50 and also charging the main capacitor 9 through the diode 51. When the charging of the main capacitor 9 is completed and its terminal voltage reaches a given level, this voltage level is detected by the gaseous discharge tube 31 to discharge the auxiliary capacitor 50, thereby supplying a current $I_O$, indicative of the completion of a charging operation, which is supplied to the base of the transistor 32, thereby turning this transistor on. The transistor 34C in the converter driving latch circuit 37C has its base-emitter path then short-circuited, whereby the transistor 33C is turned off. This means that the latch circuit 37C is deactivated. The deactivation of the latch circuit 37C turns the transistor 41 off, whereby the converter drive current $I_D$ ceases to flow, turning the control transistor 24 off. In this manner, the converter 29 ceases to oscillate. When the charge stored across the auxiliary capacitor 50 of a reduced capacitance is completely discharged within a short time interval through the gaseous discharge tube 31, the flow of the current $I_0$ ceases, turning the transistor 32 off, but the latch circuit 37C is maintained deactivated, and therefore the converter 29 is maintained out of oscillation.

Subsequently, when the synchro contact 13 is closed in response to a shutter release operation, a trigger pulse is applied to the trigger electrode 16 of the flash discharge tube 11 to cause it to be triggered, since the switch 53 in the trigger circuit 52 is closed as the main switch 59 is turned on. In this manner, the charge stored across the main capacitor 9 discharges through the discharge tube 11, which therefore emits flashlight for purpose of a flash photography. When a shutter operation of the flash photography is complete, the winding initiate switch 68 is closed, whereupon the winding latch circuit 37A is activated as a result of the transistors 33A, 34A being turned on. This permits a current to pass through the collector-emitter path of the transistor 34A through a path including the emitter-base path of the transistor 62 and the resistor 64, thereby turning the transistor 62 on. The motor 63 is then energized to start its rotation. The activation of the winding latch circuit 37A turns the transistor 32C on, whereby the base-emitter path of the transistor 34C in the converter driving latch circuit 37C is short-circuited to maintain the latch circuit 37C deactivated during the initiation of a film winding operation in order to prevent the battery 21 from being excessively loaded as a result of the oscillation of the converter 29 during the time the motor 63 is driven.

As one frame of the film is wound up under the drive from the motor 63, this fact is detected by the winding complete switch 71, which is then closed to activate the brake latch circuit 37B by turning the transistors 33B and 34B on. The activation of the brake latch circuit 37B allows a base current to be supplied to the transistor 32A from the collector of the transistor 33B through the resistor 69, thus turning the transistor 32A on. This short-circuits the base-emitter path of the transistor 34A, disabling the winding latch circuit 37A. When the latch circuit 37A is disabled, the transistor 62 is turned off, deenergizing the motor 63 and also turning the transistor 32C off. When the transistor 32C is turned off, the base-emitter path of the transistor 34C in the converter driving latch circuit 37C is freed from its short-circuited condition, but the latch circuit 37C remains deactivated.

Activation of the brake latch circuit 37B permits a base current to be supplied to the transistor 66 from the collector of the transistor 33B through the resistor 65, turning the transistor 66 on, whereby the motor 63 is short-circuited, which is effective to brake the motor 63. In this manner, the motor 63 ceases to rotate. Since the movable contact of the main switch 59 is thrown to the on contact a, and not to the contact b which would short-circuit the base-emitter path of the transistor 76, the activation of the brake latch circuit 37B permits a current flow through a path including the collector of the transistor 33B, resistor 74, capacitor 75 and the base-emitter path of the transistor 76 during a given time interval which is determined by the values of the resistor 74 and capacitor 75. Thus, the transistor 76 is turned on during such interval. As the transistor 76 is turned on, the transistor 33C in the converter driving latch circuit 37C is also turned on, whereby the transistor 34C is turned on also, thus activating the latch circuit 37C. In response thereto, the transistor 41 is turned on, allowing the converter drive current $I_D$ to flow through the base of the control transistor 24 to turn it on, thus allowing the converter 29 to resume its oscillation in order to charge the main capacitor 9. After the brake latch circuit 37B has been activated, the transistor 32B is turned on at a time interval thereafter which is determined by the values of the resistor 72 and capacitor 73, thereby short-circuiting the base-emitter path of the transistor 34B to deactivate the latch circuit 37B.

When the output from the converter 29 charges the main capacitor 9 to a given voltage, the auxiliary capacitor 50 discharges through the gaseous discharge tube 31 to turn the transistor 32 on, as mentioned previously, thereby deactivating the converter driving latch circuit 37C to cease the oscillation of the converter 29 in response to the completion of a charging operation. When the charging operation of the main capacitor 9 is completed in this manner, the winding latch circuit 37A, the brake latch circuit 37B, the converter driving latch circuit 37C, the converter control circuit 60 including the motor circuit 61 which is controlled by the latch circuits 37A and 37B as well as the converter 29 are all deactivated, avoiding a wasteful dissipation of the battery 21. Subsequently, when the synchro contact 13 is closed in response to a shutter release operation, the trigger circuit 52 operates to trigger the flash discharge tube 11, which discharges the main capacitor 9 to emit flashlight. However, the converter 29 is maintained out of oscillation until after the winding complete switch 71 is closed to activate the converter driving latch circuit 37C.

Figure 7:
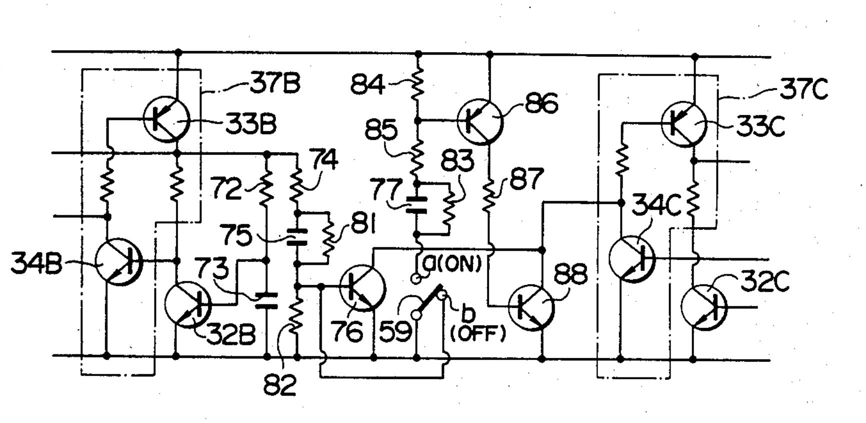
FIGS. 7 to 10 are circuit diagrams of modifications of the power supply unit shown in FIG. 6.

FIGS. 7 to 10 are circuit diagrams of several modifications of the power supply unit shown in FIG. 6. In the circuit shown in FIG. 6, if the main switch 59 is maintained for a prolonged period of time in a condition that its movable contact is thrown to the on contact a, a wasteful dissipation of the battery energy is prevented since the converter 29 ceases to oscillate, but the terminal voltage across the main capacitor 9 decreases in a gradual manner by its self-discharge, giving rise to the likelihood that an underexposure may result during a flash photography. This problem is taken into consideration in each of the electrical circuits shown in FIGS. 7 to 10. In the circuit of FIG. 7, a series combination of a resistor 74 and capacitor 75 is connected between the collector of the transistor 33B in the brake latch circuit 37B and the base of the transistor 76. The resistor 75 is shunted by a capacitor 81 which is effective to discharge the capacitor 75. The base of the transistor 76 is connected to the ground through a resistor 82. The on contact a of the main switch 59 is connected to one end of a capacitor 77, which is shunted by a discharge resistor 83. The other end of the parallel combination of the capacitor 77 and resistor 83 is connected to the positive terminal of the battery 21 (see FIG. 6) through a series combination of resistors 84 and 85. The junction between the resistors 84 and 85 is connected to the base of a PNP transistor 86, which has its emitter connected to the positive terminal of the battery and which has its collector connected through a resistor 87 to the base of an NPN transistor 88. The transistor 88 has its emitter connected to the ground and its collector connected to the collector of the transistor 76 and to the collector of the transistor 34C in the converter driving latch circuit 37C. In other respects, the arrangement is similar to that shown in FIG. 6, and therefore will not be described.

In operation, when the movable contact of the main switch 59 is thrown to the on contact a, a current flow occurs through the emitter-base path of the transistor 86, resistor 85, capacitor 77 and main switch 59, thus charging the capacitor 77. This turns the transistor 88 on. The time interval during which the transistors 86 and 88 remain on is fixed by the values of the resistor 85 and capacitor 77. After such time interval, the capacitor 77 completes its charging, turning the transistors 86 and 88 off. Once the transistor 88 is turned on, the converter driving latch circuit 37C is activated, allowing the converter 29 (see FIG. 6) to initiate its oscillation. The output of the converter 29 charges the main capacitor 9, and when the charging operation is complete, the discharge through the gaseous discharge tube 31 turns the transistor 32 (see FIG. 6) on, thereby deactivating the converter driving latch circuit 37C. The converter 29 then ceases to oscillate. A shutter release operation then takes place and the main capacitor 9 discharges through the flash discharge tube 11, which emits flashlight for purpose of a flash photography. When the shutter operation is complete, the motor 63 (see FIG. 6) effects a film winding operation, followed by the activation of the brake latch circuit 37B which applies a braking effort to the motor 63. Simultaneously, the transistor 76 is turned on for a time interval determined by the values of the resistor 74 and capacitor 75, and after the capacitor 75 has been charged, the transistor 76 is turned off. Once the transistor 76 is turned on, the converter driving latch circuit 37C is again activated, whereby the converter 29 resumes its oscillation to produce an output which charges the main capacitor 9.

It will be seen from the foregoing description that if a shutter release takes place or does not take place after the main switch 59 has been turned on, the converter 29 ceases to oscillate under the condition that the charging operation of the main capacitor 9 is completed, and the converter control circuit is also disabled. Thus, any exhaustion of the battery 21 is prevented with the main switch 59 left on if a camera is left out of use for a prolonged period of time. However, in such instance, the terminal voltage across the capacitor 9 will decrease in a gradual manner as a result of its self-discharge. Accordingly, when a shutter release is desired after the main switch 59 has been left on for a prolonged period of time, the main switch 59 is temporarily turned of or thrown to the contact b and then again turned on before the shutter release is effected. When the main switch 59 is turned off, the capacitor 77 discharges through the resistor 83, and accordingly when the main switch 59 is turned on again subsequently, a current which charges the capacitor 77 passes through the base-emitter path of the transistor 86 to turn it on. Subsequently, the operation described above takes place to allow the converter 29 to initiate oscillation, thus charging the main capacitor 9 in a supplementing manner until a given voltage level is reached. Accordingly, a shutter release which then takes place does not result in an underexposure during the flash photography. After a film winding operation has been performed by a drive from the motor 63 and the transistor 76 is turned on for a given time interval during the braking operation and then turned off, the capacitor 75 discharges through the resistor 81. Accordingly, when the brake latch circuit 37B is activated after the completion of a next film winding operation, the capacitor 75 is charged to turn the transistor 76 on for a given time interval.

Figure 8:
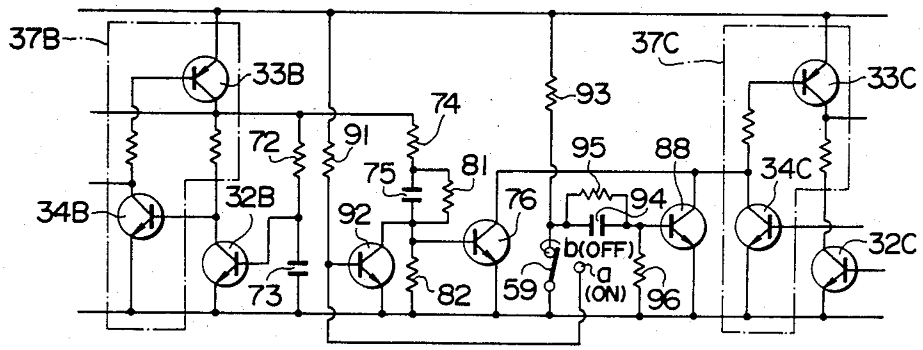
Figure 9:
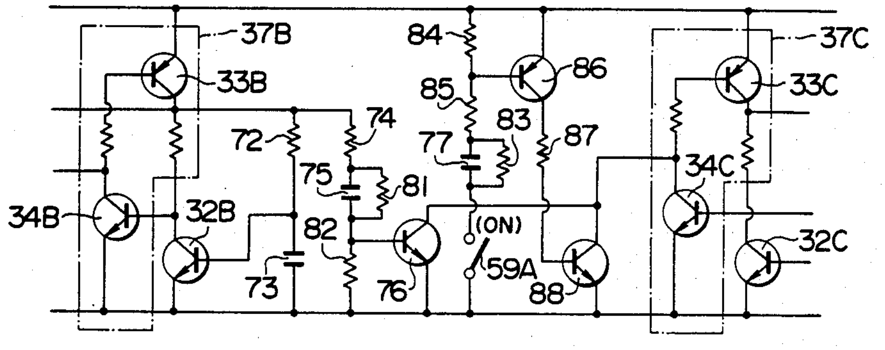

FIG. 8 shows an electrical circuit which functions in substantially the same manner as the circuit shown in FIG. 7. Specifically, a series combination of a resistor 74 and a capacitor 75 is connected between the collector of the transistor 33B in the brake latch circuit 37B and the base of the transistor 76, and the capacitor 75 is shunted by a resistor 81 as shown in FIG. 7. A resistor 82 is connected between the base of the transistor 76 and the ground. One end of a resistor 91 is connected to the positive terminal of the battery 21 and the other end thereof is connected to the base of an NPN transistor 92 and to the on contact a of the main switch 59. The collector of the transistor 92 is connected to the base of the transistor 76 while the emitter of the transistor 92 is connected to the ground. The off contact b of the main switch 59 is connected to the positive terminal of the battery 21 through a resistor 93. A parallel combination of a capacitor 94 and a resistor 95 is connected between the off contact b and the base of the transistor 88. A resistor 96 is connected between the base of the transistor 88 and the ground.

In operation, when the movable contact of the main switch 59 is thrown to the on contact a, a current passes through a path including the resistor 93, capacitor 94 and the base-emitter path of the transistor 88 for a time interval which is determined by the values of the resistor 93 and the capacitor 94. This turns the transistor 88 on, thereby activating the converter driving latch circuit 37C. After a charging of the capacitor 94 is complete, the transistor 88 is turned off. Since the base of the transistor 92 is connected to the ground through the main switch 59 whenever the latter is turned on, the transistor 92 remains off. As a consequence, the transistor 76 is turned on for a given time interval, by a current flow which charges the capacitor 75 during the initial phase when the brake latch circuit 37B is activated subsequent to the completion of a film winding operation. In this manner, the converter driving latch circuit 37C is activated. When the movable contact of the main switch 59 is thrown to the off contact b, the capacitor 94 discharges through the main switch 59. Consequently, if a camera is left without use for a prolonged period of time after the main capacitor 9 has been completely charged, and thus it is likely that the terminal voltage across the main capacitor 9 may have declined, the main switch 59 may be temporarily turned off and then turned on again. Thereupon, a charging current to the capacitor 94 turns the transistor 88 on, activating the converter driving latch circuit 37C to allow the converter 29 to initiate its oscillation. Thus, the output of the converter charges the main capacitor 9 in a supplemental manner.

Since the transistor 92 remains off if the main switch 59 is closed to the on contact a, the transistor 76 is turned on for a given time interval by a current flow which charges the capacitor 75 when the brake latch circuit 37B is activated. However, if the main switch 59 is closed to the off contact b, the transistor 92 is on, short-circuiting the base-emitter path of the transistor 76 to turn it off, thus preventing the activation of the converter driving latch circuit 37C.

In the embodiments described above, the main switch comprises a changeover switch including two contacts. However, it should be understood that a simple on-off switch may be used therefor. If this alternative is employed, the electrical circuits shown in FIGS. 7 and 8 are changed to electrical circuits shown in FIGS. 9 and 10, respectively. In the circuit shown in FIG. 9, a main switch 59A is connected between one end of the capacitor 77 and the ground. If the main switch 59A is off, the base-emitter path of the transistor 76 is not short-circuited, in distinction from the circuit shown in FIG. 7. In this embodiment, when the brake latch circuit 37B is activated upon completion of a film winding operation, the transistor 76 is turned on to activate the converter driving latch circuit 37C. In this manner, the converter oscillates to charge the main capacitor 9 to a given level.

Figure 10:
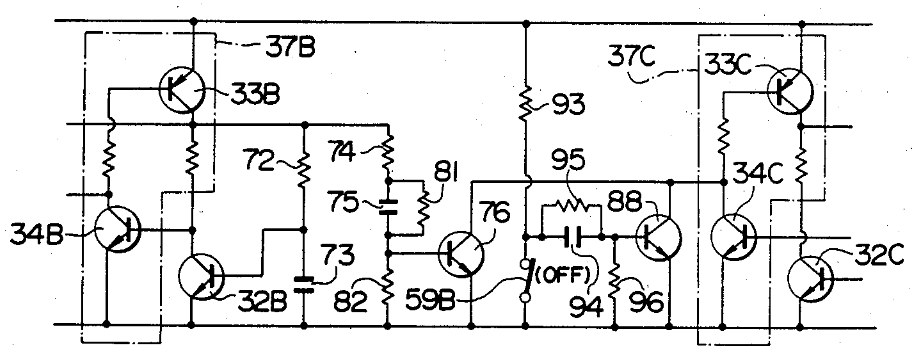

In the circuit shown in FIG. 10, a main switch 59B is connected between the junction between the resistor 93 and the capacitor 94 and the ground and is closed in its off condition. This circuit is devoid of the resistor 92 and the transistor 92, and accordingly, when the main switch 59B is off (closed), the base-emitter path of the transistor 76 is not short-circuited in distinction from the circuit of FIG. 8 and in a manner similar to the circuit shown in FIG. 9, and the transistor 76 is turned on by the activation of the brake latch circuit 37B, thereby activating the converter driving latch circuit 37C in turn.

What is claimed is:

1. A power supply unit for electronic flash, comprising:

- a converter for converting an output from a low voltage output source to a high d.c. voltage;
- a main discharge capacitor adapted to be charged by an the d.c. output from the converter;
- means for detecting when the main discharge capacitor has been charged to a given voltage;
- a manual main switch for starting the converter;
- a converter driving latch circuit activated by an operation of the main switch to deliver a drive signal to the converter so that the converter may charge the main discharge capacitor and deactivated by a signal from the detecting means to cease to drive the converter
- a film winding initiate switch which is mechanically interlocked with a completion of a shutter operation;
- a winding latch circuit activated by an operation of the film winding initiate switch to deactivate the converter driving latch circuit and to deliver a drive signal to a film winding motor;
- a winding complete switch which is mechanically interlocked with a completion of a film winding operation;
- a brake latch circuit activated by an operation of the winding complete switch to deactivate the winding latch circuit and to deliver a brake signal to the film winding motor;
- means for supplying a start signal to the converter driving latch circuit which activates the latter circuit when initiating the operation of the brake latch circuit; and
- means for deactivating the brake latch circuit at a given time interval after the initiation of operation of the brake latch circuit.

2. A power supply unit according to claim 1 in which said means for supplying a start signal is disabled when the main switch is off.

* * * * *

UNITED STATES PATENT AND TRADEMARK OFFICE
CERTIFICATE OF CORRECTION

PATENT NO. : 4,566,769

DATED : January 28, 1986

INVENTOR(S) : AKIRA INOUE

It is certified that error appears in the above-identified patent and that said Letters Patent is hereby corrected as shown below:

Column 11, line 18, change "resistor" to --capacitor--;

Column 11, line 19, change "capacitor" to --resistor--;

Column 14, line 16, delete "an";

Column 14, line 25, change "converter" to --converter;--.

Signed and Sealed this

*Second* Day of *September 1986*

[SEAL]

*Attest:*

DONALD J. QUIGG

*Attesting Officer*

*Commissioner of Patents and Trademarks*